United States Patent [19]

Haseltine et al.

[11] Patent Number: 5,369,450
[45] Date of Patent: Nov. 29, 1994

[54] ELECTRONIC AND COMPUTATIONAL CORRECTION OF CHROMATIC ABERRATION ASSOCIATED WITH AN OPTICAL SYSTEM USED TO VIEW A COLOR VIDEO DISPLAY

[75] Inventors: Eric C. Haseltine, Manhattan Beach; William G. Redmann, Simi Valley, both of Calif.

[73] Assignee: The Walt Disney Company, Anaheim, Calif.

[21] Appl. No.: 69,892

[22] Filed: Jun. 1, 1993

[51] Int. Cl.$^5$ .............................. H04N 3/233
[52] U.S. Cl. ....................... 348/745; 348/580; 348/806; 348/807; 348/746; 315/368.12
[58] Field of Search ........... 315/368.12, 368.13; 358/64, 58; 348/832, 744–747, 580, 806, 807; H04N 3/23, 3/233, 9/28

[56] References Cited

U.S. PATENT DOCUMENTS

| | | | |
|---|---|---|---|
| 3,233,513 | 2/1966 | Wagner et al. | 88/57 |
| 3,633,989 | 1/1972 | Benton | 350/3.5 |
| 3,657,981 | 4/1972 | Benton | 95/18 P |
| 3,723,805 | 3/1973 | Scarpino et al. | 315/27 |
| 3,943,279 | 3/1976 | Austefjord | 315/368.12 X |
| 4,406,532 | 9/1983 | Howlett | 354/114 |
| 4,549,208 | 10/1985 | Kamejima et al. | 358/108 |
| 4,672,275 | 6/1987 | Ando | 315/368.12 |
| 4,714,428 | 12/1987 | Bunker et al. | 434/43 |
| 4,816,908 | 3/1989 | Colineau et al. | 315/368.12 X |
| 4,834,476 | 5/1989 | Benton | 350/3.76 |
| 4,835,602 | 5/1989 | Duwaer | 315/368.12 X |
| 4,871,948 | 10/1989 | Nelson | 315/368.13 |
| 4,935,674 | 6/1990 | Rodriguez-Cavazos | 315/368.13 |
| 4,977,446 | 12/1990 | Shiomi et al. | 315/368.12 X |
| 4,986,619 | 1/1991 | Walker et al. | 350/3.61 |
| 4,999,703 | 3/1991 | Henderson | 358/64 X |
| 5,041,764 | 8/1991 | Midland et al. | 315/368.12 |
| 5,181,013 | 1/1993 | Bagshaw et al. | 358/58 X |
| 5,200,815 | 4/1993 | Tsujihara et al. | 315/368.12 X |

OTHER PUBLICATIONS

"Advanced technology: flat cold–cathode CRTs," Ivor Brodie, Information Display Jan. 1989, pp. 17–19, 1989.
"A Variable Acuity Display For Simulator Applications," Ralph W. Fisher, McDonnell Aircraft Company, 1982.
"Geometrical and chromatic aberrations of an off-axis holographic mirror," J. Phys. D: Appl. Phys. 21, pp. 96–98, 1988.
*Modeern Optical Engineering: The Design of Optical Systems*, Warren J. Smith, McGraw-Hill Book Company, pp. 49–71, 266–289 and 326–356, 1966.

Primary Examiner—Mark R. Powell
Attorney, Agent, or Firm—Mark D. Rowland

[57] ABSTRACT

Methods and systems are presented in which at least one geometric distortion function is separately determined for application to a particular primary color component of a color video display to cause a geometric distortion that compensates for lateral chromatic aberration in an optical system used to view the display.

25 Claims, 8 Drawing Sheets

ELECTRONIC AND COMPUTATIONAL CORRECTION OF CHROMATIC ABERRATION ASSOCIATED WITH AN OPTICAL SYSTEM USED TO VIEW A COLOR VIDEO DISPLAY

BACKGROUND OF THE INVENTION

The present invention relates to methods and systems for electronically or computationally transforming individual color components of an image generated by a color video display to correct chromatic aberration associated with an optical system used to view the display.

As used herein, the term "optical system" broadly includes any system in which one or more lens elements are used to form an image. It is well-known that the index of refraction of a lens element varies as a function of the wavelength of light, and that this causes the focal length of the lens element to be wavelength-dependent. This wavelength-dependent variation in focal length is known as the longitudinal chromatic aberration property of the lens element.

It is also well-known that the wavelength-dependent variation in the index of refraction causes a lens element to produce images of different sizes for different wavelengths of light. The difference between the image sizes or heights for different colors is referred to herein as lateral chromatic aberration.

Longitudinal and lateral chromatic aberrations in a lens element can create severe distortions of imagery, especially in the case of a wide angle lens element such as may be advantageously used in a head mounted display ("HMD"). An HMD is an apparatus which typically includes one or more video display devices mounted on a head frame or helmet that is worn by a person who views each display device through a virtual image optical system also mounted on the head frame or helmet. The virtual image optical system expands the field of view subtended by the display devices, thus magnifying the images they generate and providing the viewer with a more compelling feeling of immersion in the imagery. Various types of small, lightweight display devices have been used in HMD's, including monochrome cathode ray tubes ("CRT's"), monochrome and full color liquid crystal matrices, scanned LED arrays and fiber optic rope. Large field sequential full color CRT displays also may be incorporated into an HMD, as is disclosed in commonly assigned co-pending patent application Ser. No. 08/049,563, entitled "Head Mounted Display" and filed Apr. 19, 1993 in the name of Eric C. Haseltine, the disclosure of which is incorporated herein by reference.

Full color video or computer graphics images (e.g., images combining red, green and blue primary colors) generated by display devices having high resolution can provide a person wearing an HMD with a startling illusion of realism. However, chromatic aberration in the optical system through which the display devices are viewed may, along with other types of aberrations (e.g., spherical aberration, coma, astigmatism, field curvature, pin-cushion and barrel distortions), distort the imagery presented to the viewer to the point that the illusion of realism is substantially compromised.

The chromatic aberration properties of a lens element can be corrected. Conventional optical techniques for correcting chromatic aberration usually require the use of additional lens elements to provide achromatic doublet or apochromatic triplet lens combinations. These multi-element optical systems are larger, heavier and more expensive than a single simple positive lens. As a result, such conventional optical correction techniques are not well-suited for use in HMD's and other applications requiring a compact and lightweight optical system.

Various electronic and special image recording techniques which provide compensation for geometric optical distortions in display systems have been disclosed in the prior art, but these techniques have either failed to address the effect of chromatic aberration or do not provide chromatic aberration correction suitable for use with video imagery generated in real time, as would be required for an HMD driven by a computer graphic image generator in a virtual reality entertainment system.

In view of the foregoing, it would be desirable to be able to provide real time chromatic aberration correction for an optical system used to view a color video display, and it would be desirable to be able to provide such correction without requiring a multiple-element lens system or without otherwise adding to the size, weight and cost of the optical system.

SUMMARY OF THE INVENTION

It is therefore an object of the present invention to provide real time chromatic aberration correction for an optical system used to view a color video display.

It is also an object of the present invention to provide a chromatic aberration correction technique that can be used with various types of video display devices, including CRT and LCD matrix displays, and in conjunction with correction techniques for other types of aberrations.

It is a further object of the present invention to reduce the size, weight and cost of an optical system capable of providing chromatically-corrected images of a color video display.

These and other objects and advantages of the present invention are accomplished by a method and system in which at least one geometric distortion function is separately determined for application to a particular primary color component of the color video display. The function defines a geometric distortion that is substantially equal to the inverse of the geometric distortion in the respective color component caused by lateral chromatic aberration in the optical system (as measured from an arbitrarily selected reference wavelength), and is used to transform, either electronically or computationally, a signal which conveys information to the color video display regarding the respective color component of images to be viewed. The transformation of the signal causes lateral chromatic aberration of the respective color component to be substantially cancelled when the images generated by the color video display are viewed through the optical system. Alternatively, in the case of matrix type displays, the function may be used to determine a differential distortion to be applied to the layout of the matrix elements used to display a particular primary color component.

In a preferred embodiment, a separate distortion function is determined for each primary color component of the color video display device (e.g. red, green and blue). The separate "pre-distortions" for the red, green and blue color primaries can be applied in or by any one or more of several different display system components and processes, including: the image rendering algorithm of a computer graphic image generator, the deflection system of a field sequential color video display, the data buffers of a display driver, or, as previously mentioned, the matrix layout of a matrix type display.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1A:
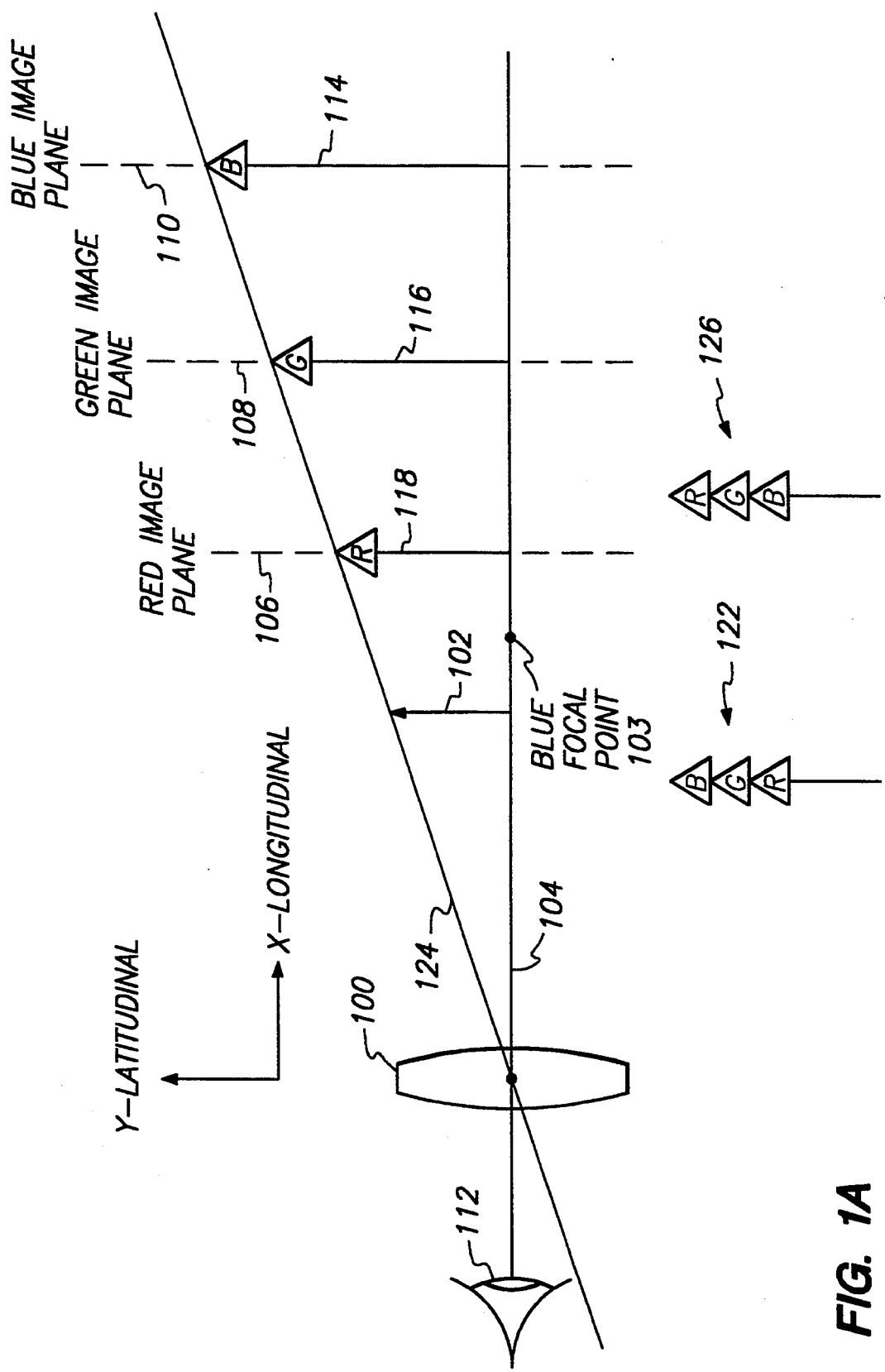
FIGS. 1A and 1B illustrate (not to scale) the phenomena of longitudinal chromatic aberration and lateral chromatic aberration associated with a positive lens used to view the image of an extended object displayed by a color video display, and correction of lateral chromatic aberration in accordance with principles of the present invention.

The phenomena of longitudinal and lateral chromatic aberrations are illustrated in FIG. 1A. FIG. 1A shows a positive lens element 100 and an arrow 102 representing a white object placed inside the blue wavelength front focal point 103 of lens element 100. A magnified virtual image of the object is formed by lens element 100 behind the object. However, because the index of refraction of optical materials is generally higher for short wavelengths than for long wavelengths, lens element 100 will refract shorter wavelengths more strongly than longer wavelengths at each of its surfaces, such that different color components of the virtual image of object 102 will be focused at different positions along the optical axis 104 of the lens element.

FIG. 1A illustrates the particular case in which white object 102 is an image formed on the display surface of a full color CRT, such that the white color of the object is comprised of distinct red, green and blue primary color components emitted respectively by the corresponding red, green and blue colored phosphor dots of the CRT screen. Due to its chromatic aberrations, positive lens element 100 has different image planes for the red, green and blue light rays emitted by the CRT, each image plane being at a different distance from lens element 100 as measured in the longitudinal, or x, direction. Also due to its chromatic aberrations, lens element 100 has a different lateral magnification parameter for each of the red, blue and green image planes (i.e., the ratio of the virtual image size at the image plane to object size as measured in the latitudinal, or y, direction varies from one image plane to the next).

The red image plane 106 is the closest to lens element 100, followed by green image plane 108 and, at the furthest longitudinal distance from lens element 100, blue image plane 110. For an observer having an eyepoint 112 on the optical axis, the blue color component of the virtual image (as represented by arrow 114) will appear to be further from lens element 100 than green color component (as represented by arrow 116), and green color component 116 will appear to be further from the lens element than the red color component (as represented by arrow 118). The height of the blue color component of the image in the positive latitudinal, or positive y, direction, will appear to the observer to be greater than that of the green color component, which in turn will appear to have a greater height than the red color component. The tendency for rays of different wavelengths to focus at different planes is the longitudinal chromatic aberration property of lens element 100, and the tendency for rays of different wavelengths to focus into images of different sizes is the lateral chromatic aberration property of lens element 100.

The observer will most likely perceive the red, green and blue image planes as being roughly superimposed at an apparent image plane in the vicinity of the green image plane. Lateral chromatic aberration, however, gives rise to the perception of relative shifts in the positions of the color components of the object such as is shown by the superimposed arrow heads 122 in FIG. 1A.

Figure 1B:
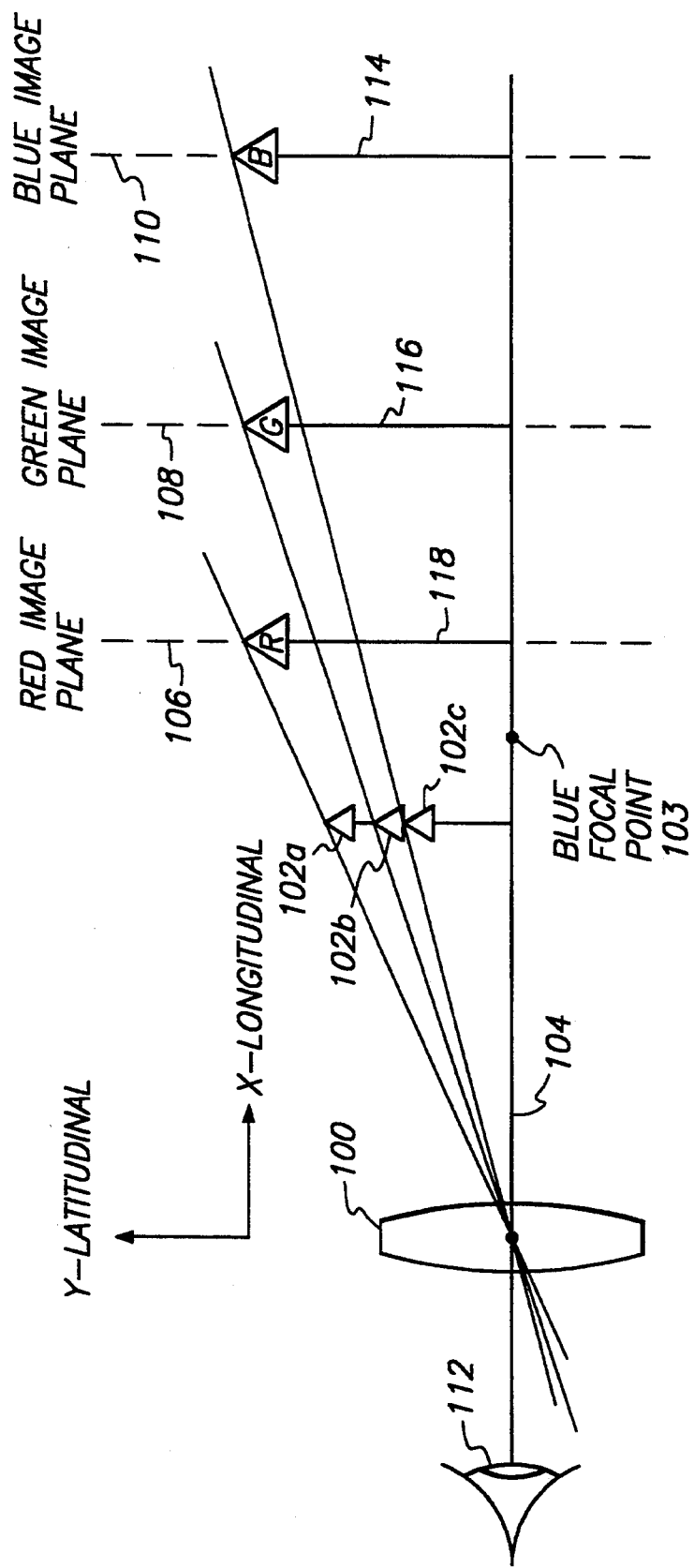

These relative shifts will appear to the observer as color "fringing". In accordance with principles of the present invention, correction of (or compensation for) the lateral chromatic aberration property of lens element 100 is provided by introducing differential geometric distortion into the color components of the image of object 102 generated by the CRT to substantially cancel the differences in image heights of the red, green and blue color components of the virtual image formed by lens element 100. This is accomplished by determining one or more color-specific distortion functions (taking into account the different lateral magnification parameters of lens element 100 for the red, green and blue image planes) which are applied to the geometry of one or more of the red, green and blue color components of object 102 to counter the effect of the chromatic differential in lateral magnification. The result of applying such distortion functions to the image of object 102 is illustrated in FIG. 1B, wherein the image of object 102 as displayed on the CRT is distorted into different sized red, green and blue color components (as represented respectively by arrows 102a, 102b and 102c) in substantially inverse proportion to the differences in lateral magnification for each color component, such that the red, green and blue color components of the virtual image of object 102 formed by lens element 100 are of substantially equal height. It may not be necessary to apply a distortion function to every primary color component. For example, one color component (e.g., green) may be selected as a reference for the final image. Thus, differential distortion functions may be applied to the red and blue color components to align them with the green color component (i.e., the mid-range wavelength).

If the observer views the image from a different position in the aperture of lens element 100, the chromatic aberrations will change. In an extreme case, where the observer is looking at a point in the image from rays that pass below the chief ray from that point (i.e., a ray passing through the center of the lens element, as illustrated in FIG. 1A by chief ray 124 emanating from the top point of object 102), the relative lateral displacements of the different color components of object 102 would reverse themselves as shown, for example, by superimposed arrow heads 126. The present invention can correct for such shifts by incorporating a sensing device, such as an eye tracker, that detects the observer's pupil position and adjusts the distortion functions accordingly.

However, in the majority of applications, the assumption that an observer's eye is near the optical axis will be valid. When the observer's eye is on axis, a single set of red, green and blue distortion functions will be sufficient to produce significant correction of lateral chromatic aberrations.

Generally, the distortion to be applied to any particular portion of an image generated by a display device is a function of the position of that portion of the image relative to the optical axis of the lens element, since the direction of refraction varies from point to point on the lens element surfaces. Thus, the present invention involves positioning each primary wavelength of a color display device differentially, based on its refraction as a function of position, to chromatically pre-distort the imagery for chromatically distorting optics.

The present invention is primarily directed to correcting, wholly or partially, lateral chromatic aberration. However, as will be apparent from the following discussion, the present invention can be used in conjunction with corrective measures directed to other types of aberration, including, for example, pin-cushion and barrel distortions. These aberrations are additive in effect, and thus preferably compensated in a comprehensive manner.

In accordance with one aspect of the present invention, each primary wavelength of a full color CRT or other color video display device is positioned differentially by applying different distortion functions to individual color component image display control signals associated with the display device. As used herein, the phrase "color component image display control signal" refers to a signal used to control the display of a particular one of a plurality of color components of an image generated by a color video display device, wherein the term "signal" refers generally to a function that conveys information, including continuous and discrete one-dimensional functions of time (e.g., an analog or digital electromagnetic waveform) and multiple-dimensional matrices of discrete data points (e.g., digital image data stored in a data buffer). The distortion functions transform the signals to which they are applied to differentially pre-distort the color components in accordance with the optical characteristics of the particular optical system used in the display system. The application of the distortion functions to the color component image display control signals may be accomplished in various ways. For example, depending on the particular display system architecture employed, the transformation of the signals may be achieved either electronically or computationally. FIGS. 2A–2D illustrate various exemplary display system architectures configured to implement this aspect of the present invention.

Figure 2A:
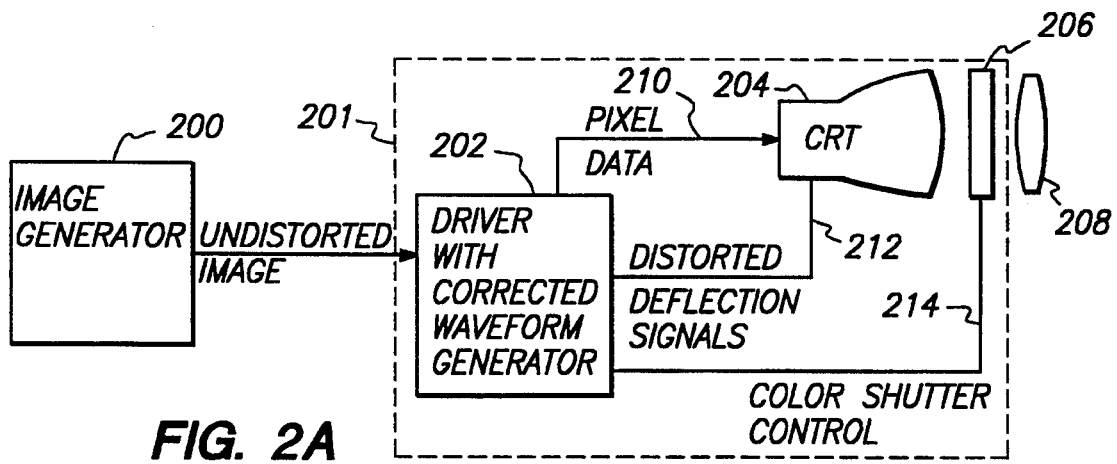
FIGS. 2A–2D illustrate various exemplary architectures of video display systems incorporating chromatic aberration correction in accordance with principles of the present invention.

FIG. 2A shows an embodiment of a color frame sequential display system including: an image generator 200; a color video display 201 having display driver circuitry 202, a monochrome CRT video display device 204 and a color shutter 206; and an optical system 208. In this architecture, image generator 200 provides display driver circuitry 202 with sequential frames of digital data representative respectively of the red, green and blue primary color components of an image to be generated by CRT video display device 204. The digital data supplied by image generator 200 represents an "undistorted image" in that the data has not been chromatically pre-distorted. The term "undistorted" is used herein to refer generally to image display control signals that are not chromatically pre-distorted; however, it is to be understood that the term is merely used as a convenient denominator and does not connote any particular signal shape or image content or that the signal is free of other types of distortion.

Display driver circuitry 202 sequentially supplies each frame of primary color data to monochrome CRT 204 as pixel intensity data 210 while simultaneously generating synchronized deflection signals 212 and color shutter control signals 214 and providing these signals to CRT 204 and color shutter 206 respectively. Correction for lateral chromatic aberration in optical system 208 is provided by circuitry in display driver 202 which drives linear deflection amplifiers with non-linear waveforms that are unique to the red, green and blue frames of video information and that are generated by transforming conventional undistorted deflection signals using distortion functions implemented in the display driver circuitry. Further explanation of the operation of a frame sequential color display system of the type shown in FIG. 2A and an exemplary implementation of the present invention in such a system is provided in connection with the display system embodiment illustrated in FIG. 6.

Figure 2B:
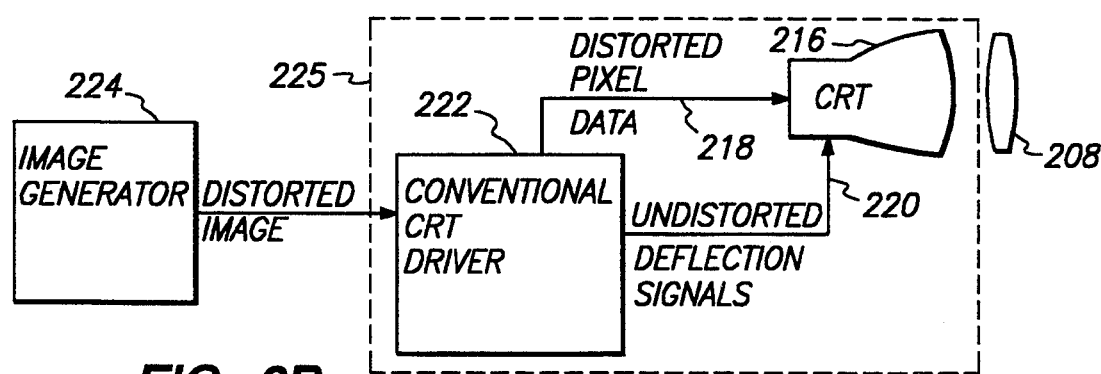

FIG. 2B illustrates a display system architecture in which the red, green and blue color components of each pixel of a full color CRT display device 216 are presented simultaneously by the display. Pixel data 218 and undistorted deflection signals 220 are provided to conventional color video display 225 which includes conventional CRT display driver circuitry 222 and a full color CRT display device 216. The correction for lateral chromatic aberrations in optical system 208 is performed in image generator 224, which implements in software or hardware (or both) a transformation process by which corrective differential geometric distortions are introduced into the red, green and blue color component data of an undistorted image while the color component data is stored in frame buffers of the image generator, or as the data is being transferred into or out of the frame buffers.

Figure 2C:
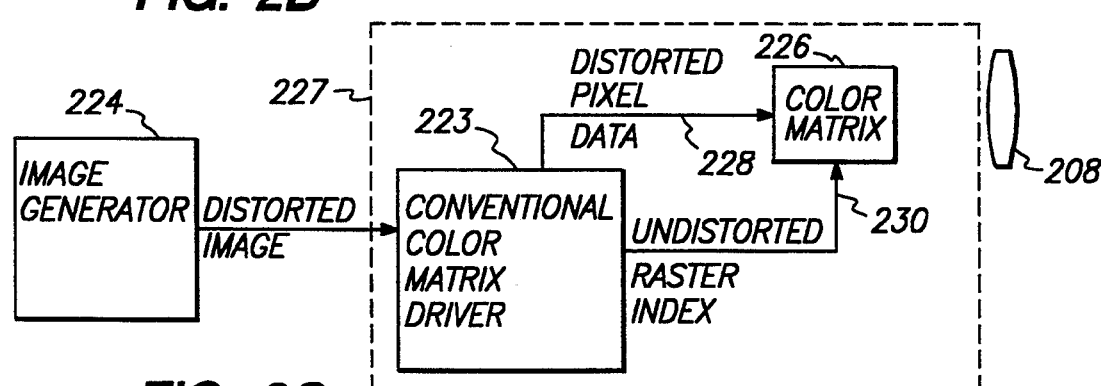
Figure 2D:
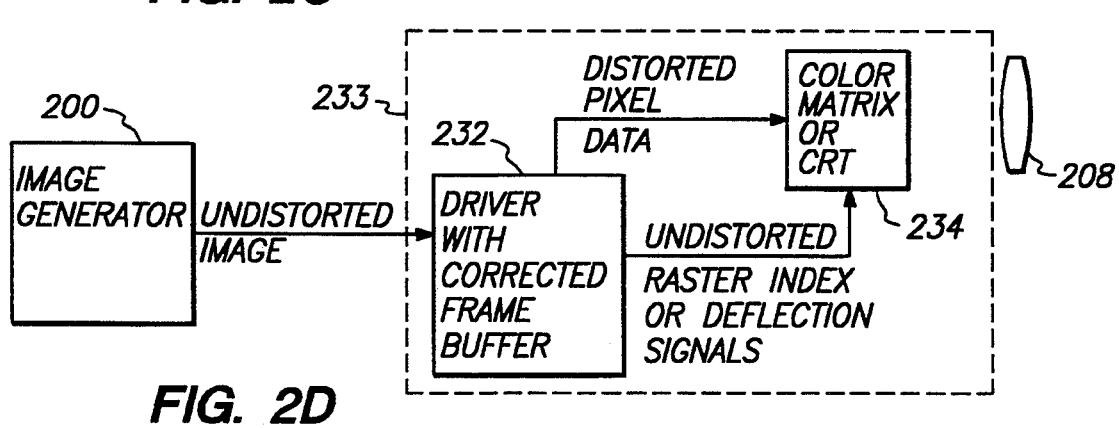

The video buffer distortion method of the present invention may similarly be implemented in display system architectures incorporating other types of display devices that present multiple primary color components simultaneously, such as the architecture shown in FIG. 2C which drives a color matrix display device 226 of video display 227 using geometrically distorted pixel color component data 228 and undistorted raster index signals 230 from conventional color matrix display driver circuitry 223. Color matrix display device 226 may be implemented using any one of various conventional matrix display technologies such as LCD, LED, electroluminescent or plasma panel display technology. Alternatively, the video buffer distortion method of the present invention may be implemented in the display driver circuitry of the display system. This implementation is illustrated in FIG. 2D, in which display driver circuitry 232 of video display 233 incorporates separate data buffers for red, green and blue color components of an image to be displayed by a CRT, color matrix or other type of display device 234. Undistorted image data is supplied to the data buffers of display driver circuitry 232 by image generator 200. Display driver circuitry 232 applies separate distortion functions to the color component data while the data is stored in the data buffers (or as the data is being transferred into or out of the data buffers to introduce differential geometric distortions into the color components of the image to be displayed. The distortion functions are applied by a transformation process which may be implemented in hardware or software, or both.

Using the video buffer distortion method of the present invention as implemented in the systems of FIGS. 2C and 2D, the distortion functions may be applied to video images generated and displayed in real time. As used herein, the phrase "in real time" means that the digital data representing the images are computed by the image generator concurrently with display of the images at a conventional video rate (i.e. at a 25 Hz frame rate or greater). However, the present invention may also be used with previously recorded imagery, in which case the distortion functions may be applied by off-line processing of digital data representing the recorded imagery.

Figure 3A:
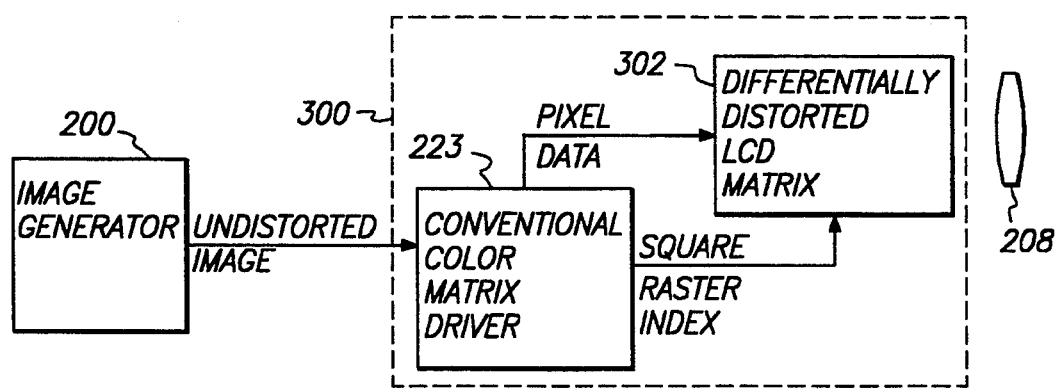
FIGS. 3A and 3B illustrate another exemplary video display system architecture incorporating correction for lateral chromatic aberration in accordance with principles of the present invention.
Figure 3B:
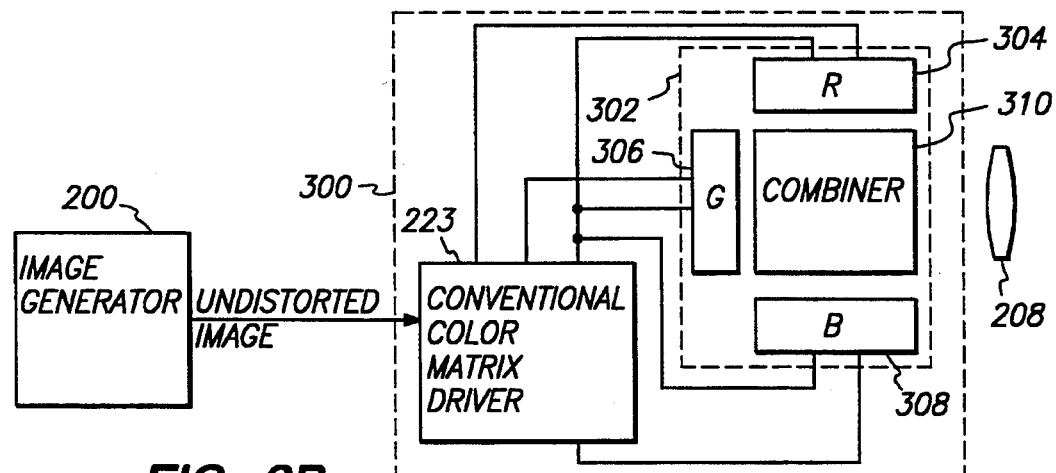

FIGS. 3A and 3B illustrate an additional alternative architecture for implementing the present invention in display systems in which an optical system is used to view a matrix type display device (e.g., an LCD matrix). As shown in FIG. 3A, conventional video signals are supplied through conventional color matrix display driver 223 of video display 300 to a color matrix display device 302 which has been designed such that the matrices of display elements for the primary color components are differentially positioned to compensate for lateral chromatic aberration in optical system 208. FIG. 3B provides further detail concerning the architecture of the display system of FIG. 3A, showing particularly that color matrix 302 comprises separate two-dimensional grids of pixel elements for the red, green and blue primary color components of the display (304, 306 and 308, respectively), as disclosed for example in Baur et al. U.S. Pat. No. 5,115,305. The grids are assembled around a combiner 310 to form a display. The pixel positions on the grids are differentially distorted from conventional rectangular arrays of grid points in accordance with a separate distortion function for each color component. The grid points of the red, green and blue grids are scanned simultaneously such that the red, green and blue color components are displayed concurrently.

The distortion functions to be used in the various implementations of the present invention illustrated in FIGS. 2A-2D and 3A-3B may be determined empirically or computationally, or by a combination of empirical and computational processes. Initially, the characteristics of the optical system must be determined. For chromatic aberrations this includes determining the refraction of each primary color as a function of position or eccentricity from the optical axis. This may be accomplished by acquiring the transfer function from the lens manufacturer, or by a conventional empirical mensuration technique.

The appropriate primary color wavelengths to be used in characterizing the distortion characteristics of the target optical system can be derived from the particular display device to be viewed through the target optical system. The three colors in the display triad, whether LCD, CRT or another type of display technology, may be obtained from the manufacturer, measured or otherwise determined empirically. The distortion functions may be implemented in the form of equations evaluated by a software algorithm, look-up tables (LUT) or hardware logic.

Figure 4:
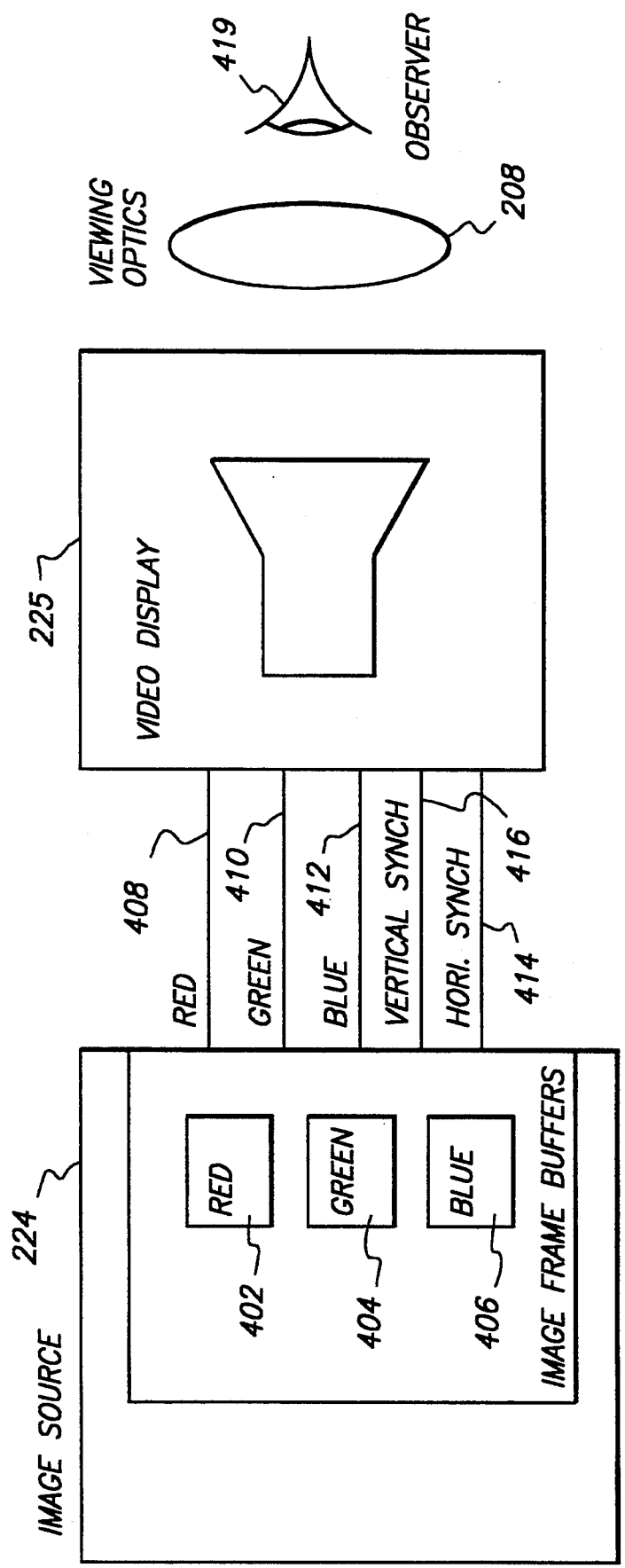
FIG. 4 is a block diagram of an exemplary embodiment of a color video display system including an image source having red, green and blue image frame buffers.
Figure 5:
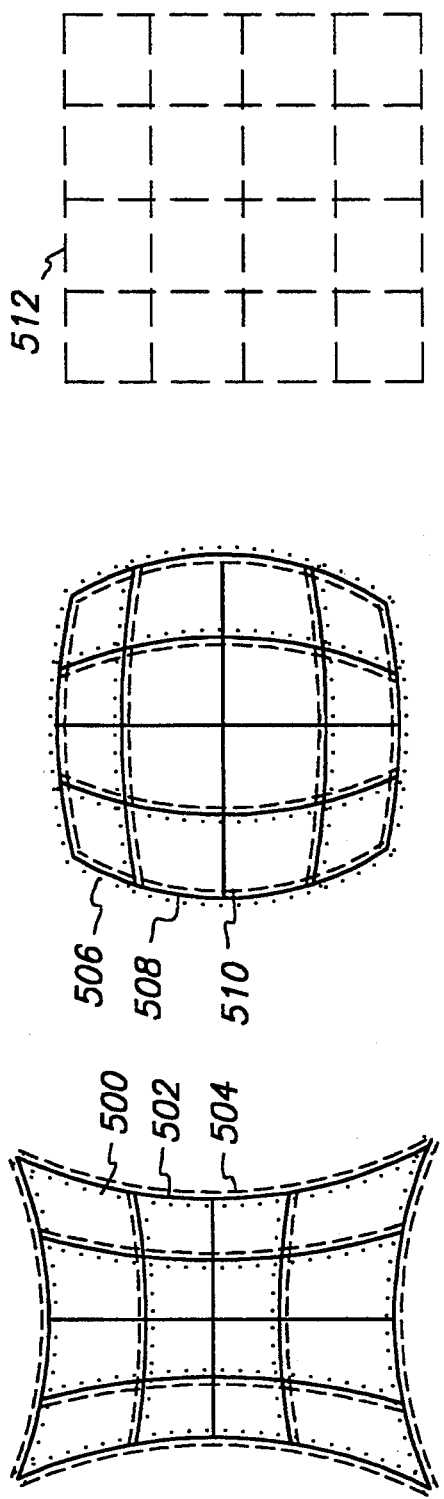
FIG. 5 illustrates exemplary red, green and blue image frame signals transformed in the image frame buffers of the image source of FIG. 4 to provide correction of pin-cushion distortion in an optical system with lateral chromatic aberration in accordance with principles of the present invention.

FIGS. 4 and 5 provide further illustration of an implementation of the previously described video buffer method of the present invention in an exemplary display system embodiment. In accordance with the video buffer method, separate distortion maps are created for the red, green and blue imagery stored in the buffer memory of a video source, such as a real-time computer image generator. The distortions in the separate color buffers are the inverse of lateral chromatic distortions produced by uncorrected viewing optics as measured from an arbitrarily selected reference wavelength. The combination of predistortions in the image source frame buffers, and chromatic distortions of the viewing optics, result in a substantially undistorted final image to observers.

In FIG. 4, video (or computer graphic image) source 224, having separate image frame buffers 402, 404, 406 for red, green and blue components of an image, supplies red, green and blue video signals 408, 10, 412 and horizontal and vertical synchronization pulses 414, 416 to conventional color video display 25. The display device of video display 225 may be substantially any type of conventional display device such as a CRT, matrix display, mirror scanned laser projector, deformable mirror, oil-film light valve projector or liquid crystal light valve projector device. The imagery displayed by video display 225 is viewed by an observer 419 through viewing optics 208 which do not have correction for lateral chromatic aberrations.

The pixels in the red, green and blue frame buffers are re-mapped in a manner appropriate for the geometric distortion for each primary color component of the image. The re-mapping can be accomplished with commercially available digital image distortion processes such as Non-Linear Image Mapping, offered by Evans and Sutherland Computer Corporation of Salt Lake City, Utah, in their ESIG image generators, or Comprehensive Distorting Correction, offered by General Electric Aerospace Simulation and Control Systems Department of Daytona Beach, Florida, for their CompuScene line of computer image generators. Other image warping devices, such as those produced by Ampex Corporation of Redwood City, Calif., Quantel Corporation of Berkshire, England and Datacube Corporation of Peabody, Mass., also can re-map red, green and blue pixels to accomplish precompensation of lateral chromatic aberration. One means of programming commercially available digital distortion systems is to compute a separate view window for each color primary, such that each view window is displayed with a unique set of distortion functions appropriate for that wavelength.

Many wide angle viewing optics produce a pincushion type of distortion, as illustrated in FIG. 5A. Without optical correction of the lateral chromatic aberrations inherent in such optical systems, the pincushion distortion will affect the red, green and blue components of an image viewed through the optical system in varying amounts. This is illustrated in FIG. 5A, which shows superimposed images of the red color component 500, green color component 502 and blue color component 504 of a white square grid pattern generated on a color video display (without chromatic predistortion) and viewed through an optical system with lateral chromatic aberration. As can be seen from FIG. 5A, the blue component 504 of the image will typically have the largest amount of pin-cushion distortion, with decreasing amounts of distortion in the green component 502 and red component 500 respectively. By producing different barrel distortions in each color bit plane that are the inverse of the pin-cushion distortions unique in each color component, the observer will be presented with a video image that is substantially free of lateral chromatic aberration. FIG. 5B shows how different amounts of barrel distortion in the three color frame buffers 402, 404 and 406 can be used to compensate for varying amounts of pin-cushion distortion in red, green and blue wavelengths passing through viewing optics 208 such that an observer perceives a substantially undistorted image 512 of a white square grid pattern as shown in FIG. 5C. More particularly, FIG. 5B shows superimposed distorted patterns 506, 508 and 510 represented by the digital data stored in the frame buffers 402, 404 and 406 respectively after the data has been transformed by differential distortions from initial identical square grid patterns. The largest amount of barrel distortion is in red component 506, with decreasing amounts of distortion in the green 508 and blue 510 components respectively.

Figure 6:
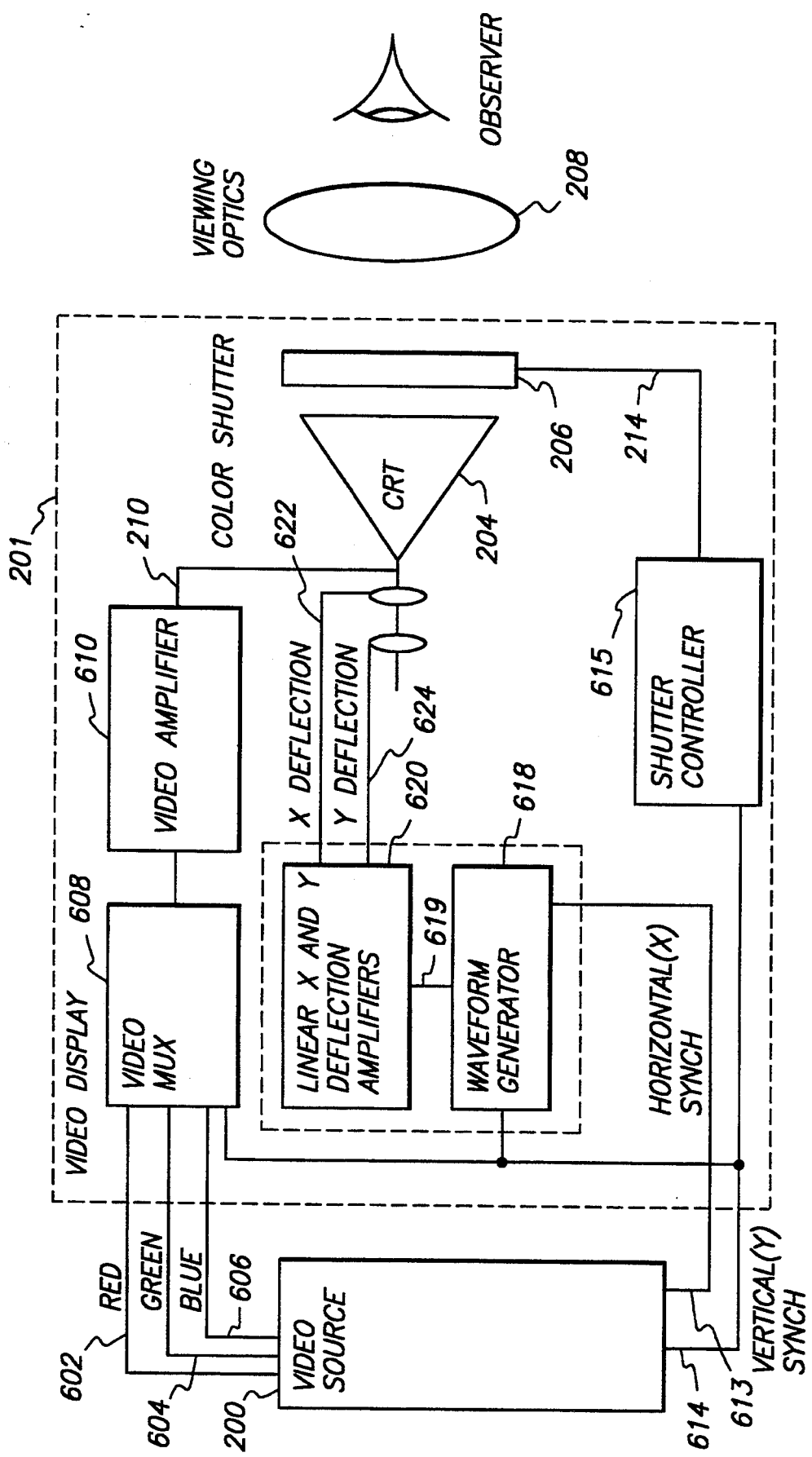
FIG. 6 is a block diagram of an exemplary embodiment of a frame sequential color video display system incorporating a non-linear waveform generator in accordance with principles of the present invention.
Figure 7:
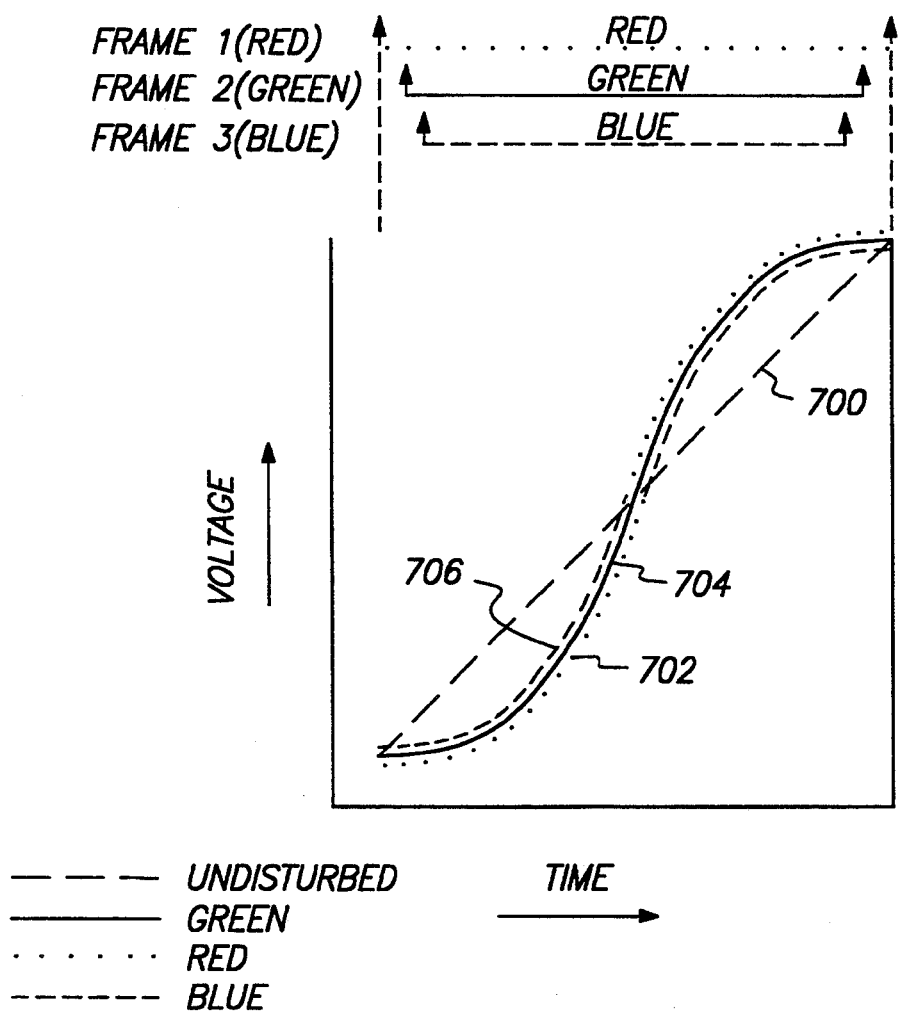
FIG. 7 illustrates exemplary waveforms for red, green and blue deflection ramp output signals of the non-linear waveform generator of FIG. 6 transformed to compensate for lateral chromatic aberration in accordance with principles of the present invention.

FIGS. 6 and 7 provide further illustration of an exemplary implementation of the frame sequential method of the present invention, whereby color-specific distortions are created in the video display by driving linear deflection amplifiers with non-linear waveforms that are unique to red, green and blue video frames of information. As previously discussed, this method is intended for use with frame sequential color displays.

Frame sequential color displays work on the principle that the human eye will integrate red, green and blue information presented at separate times, as if the information were presented simultaneously, provided that the separate presentations of red, green and blue video frames of information occur within short intervals of each other. Many video displays present a new frame of information, simultaneously containing red, green and blue information, 60 times per second. A frame sequential color display will present red, green and blue frames of a video image at 180 times per second in sequence. Thus, a complete frame of information is still presented at 60 times per second, but the red, green and blue components of each frame are presented at different times. Frame sequential color displays have the advantage of inherent convergence, because the same location on the display surface is used to convey red, green and blue information. By contrast, a shadow mask CRT or matrix type display presents red, green and blue components of each pixel from spatially separate locations.

As shown in FIG. 6, frame sequential video display 201 receives sequential red, green and blue video inputs 602, 604, 606 from image generator 200 that are provided as inputs to a multiplexing video switcher (shown in the figure as video mux 608). Video mux 608 in turn supplies a single channel of video information to a video amplifier 610. Video amplifier 610 generates a pixel data signal 210 which modulates the intensity of the display device 204 at each pixel location. When the video amplifier receives "red" video from the mux, it will modulate the red portion of the image. When the video amplifier receives "green" video, it will modulate the green portion of the video, and when the video amplifier receives "blue" video it will modulate the blue portion of the image.

The image source also supplies horizontal and vertical synchronization signals 613, 614 to the video display. These synchronization signals have several purposes. First, the synchronization signals tell the video display when to start horizontal and vertical scans of information. Second, the vertical component of the synchronization signal is provided to a shutter controller circuit 615 to cause the shutter controller circuit to generate color shutter control signal 214. Color shutter control signal 214 controls the switching of a color shutter 206 that sequentially passes red, green and blue components of a broadband display source, such as a CRT with a white phosphor. Third, the vertical synchronization pulse causes the mux to pass video appropriate for the state of color shutter 206 in front of the display source. Fourth, the vertical synchronization signal causes a waveform generator 618 to output a control signal 619 based on a stored deflection waveform that causes linear X and Y deflection amplifiers 620 to drive display device 204 with non-linear X deflection and Y deflection signals 622, 624 (which together comprise distorted deflection signals 212 of FIG. 2A) to produce the desired distortion of the image for each of the separate colors at each scan line. In the case of a wide angle lens with pin-cushion distortion, the waveform generator would produce deflection ramp signals having shallower slopes at the beginning and end of each sweep than at the middle of each sweep, in order to achieve a barrel type of distortion that cancels the pin-cushion distortion of the optics. The waveforms would be unique for each scan line of information, and unique for each color.

For example, in a typical system, the waveform of deflection signal 619 for a scan line half way from the top of the display, running left to right through the display center, would appear like the linear ramp 700 shown in FIG. 7 if no distortion were present. With barrel distortion, the deflection waveform for each of the red, green and blue color components would have the "S" shape shown in FIG. 7 by curves 702, 704, 706, and the form of the "S" curve would be different for that scan line for each different color frame. Typically, the viewing optics will produce a lateral chromatic aberration, as viewed from the optical axis, that places red components of each pixel nearer to the display center than green components of a pixel, and green components nearer to the display center than blue components of a pixel. In such cases, the barrel distortion to correct for the combination of geometric and chromatic aberrations, would be the most for the blue frame of video, followed in magnitude by the green and red frames respectively.

One skilled in the art will appreciate that the present invention can be practiced by other than the described embodiments, which are presented for purposes of illustration and not of limitation, and the present invention is limited only by the claims which follow.

We claim:

1. A method for correcting a chromatically variant optical aberration of an optical system interposed in a display system between a viewer eye position and a display surface of a color video display device to form a virtual image of the display surface, comprising the steps of:

provinding color component image display control signals for a plurality of color components of an image to be displayed by the color video display device on the display surface;

defining a distortion function for a particular color component of the color video display device based on the chromatically variant optical aberration of the optical system; and differentially transforming the color component image display control signals by applying the distortion function to a color component image display control signal for the corresponding particular color component to introduce chromatically variant distortion in the image displayed on the display surface that compensates for the optical chromatic aberration of the optical system in the virtual image.

2. The method of claim 1, wherein the color component image display control signals comprise deflection signals for a color field sequential display device that are generated one color component field at a time in a field by field time sequence, and wherein the step of differentially transforming the color component image display control signals is performed by applying the distortion function to a deflection signal during the time of a select color component field in the field by field time sequence.

3. The method of claim 2, wherein the distortion function defines a non-linear distortion of a deflection signal.

4. The method of claim 1, wherein the color component image display control signals comprise digital data representative of corresponding color components of a two-dimensional image pattern.

5. The method of claim 4, wherein the distortion function comprises a function for translating the digital data representative of a color component into a distorted image pattern.

6. The method of claim 5, wherein a plurality of different images are sequentially displayed by the color video display device at video rate and wherein an image pattern and a distorted image pattern are generated in real time for each of the plurality of images.

7. The method of claim 5, wherein a plurality of different images are sequentially displayed by the color video display device at video rate and wherein an image pattern and a distorted image pattern are generated off line prior to display of any of the plurality of images.

8. A method for correcting a chromatically variant optical aberration of an optical system interposed in a display system between a viewer eye position and a display surface of a color video display device to form a virtual image of the display surface, comprising the steps of:

providing color component image display control signals for a plurality of color components of an image to be displayed by the color video display device on the display surface;

defining a different distortion function for each color component of the color video display device based on the chromatically variant optical aberration of the optical system; and differentially transforming the color component image display control signals by applying the distortion functions to the color component image display control signals to introduce chromatically variant distortion in the image displayed on the display surface that compensates for the optical chromatic aberration of the optical system in the virtual image.

9. The method of claim 8 wherein the color component image display control signals comprise deflection signals for a color field sequential display device that are generated one color component field at a time in a field by field time sequence, and wherein the step of differentially transforming the color component image display control signals is performed by applying each distortion function to a deflection signal during the time of a different color component field in the field by field time sequence.

10. The method of claim 9, wherein each of the distortion functions defines a non-linear distortion of a deflection signal.

11. The method of claim 8, wherein the color component image display control signals comprise digital data representative of corresponding color components of a two-dimensional image pattern.

12. The method of claim 11, wherein each of the distortion functions comprises a function for translating the digital data representative of a color component into a distorted image pattern.

13. A method for correcting a chromatically variant optical aberration of an optical system interposed in a display system between a viewer eye position and a display surface of a color video display device to form a virtual image of the display surface, comprising the steps of:

defining a distortion function for a particular color component of the color video display device based on the chromatically variant optical aberration of the optical system; and differentially positioning display elements for different color components of the color video display device by applying the distortion function to a layout pattern of the display elements for the corresponding particular color component to introduce chromatically variant distortion in an image displayed on the display surface that compensates for the optical chromatic aberration of the optical system in the virtual image.

14. The method of claim 13, wherein the color video display device comprises a color matrix display.

15. A method for correcting a chromatically variant optical aberration of an optical system interposed in a display system between a viewer eye position and a display surface of a color video display device to form a virtual image of the display surface, comprising the steps of:

defining a different distortion function for each color component of the color video display device based on the chromatically variant optical aberration of the optical system; and differentially positioning display elements for the color components of the color video display device by applying the distortion functions to layout patterns for the display elements corresponding to the color components to introduce chromatically variant distortion in an image displayed on the display surface that compensates for the optical chromatic aberration of the optical system in the virtual image.

16. The method of claim 15, wherein the color video display device comprises a color matrix display.

17. Apparatus for displaying an image to a viewer through an optical system having a chromatically variant optical aberration, comprising:

a color video display device having a display surface disposed in the apparatus such that the optical system is interposed between the display surface and the viewer to form a virtual image of the display surface at a viewer eye position; and display driver circuitry electrically coupled to the color video display device to provide first color component image display control signals for a plurality of different color components of the color video display device, the display driver circuitry having at least one input for receiving second color component image display control signals from an image source, and circuitry which differentially transforms one of the first and second color component image display control signals to introduce different geometric distortion into each color component of an image displayed by the color video display device on the display surface, the different geometric distortions causing chromatically variant distortion in the image displayed on the display surface that compensates for the optical chromatic aberration of the optical system in the virtual image.

18. The apparatus of claim 17, wherein the first color component image display control signals comprise deflection signals for a color field sequential display device that are generated one color component field at a time in a field by field time sequence, and wherein the same display driver circuitry differentially transforms the color component image display control signals for a plurality of different color components of the color video display device by applying different distortion functions to the deflection signals during the times of different color component fields in the field by field time sequence.

19. The apparatus of claim 18, wherein the display driver circuitry differentially transforms the first color component image display control signals by introducing non-linear distortion into a deflection signal.

20. The apparatus of claim 17, wherein the second color component image display control signals comprise digital data representative of corresponding color components of a two-dimensional image pattern.

21. The apparatus of claim 20, wherein the display driver circuitry differentially transforms the second color component image display control signals by translating the digital data representative of a color component stored in a frame buffer into a distorted image pattern.

22. The method of claim 6 further comprising the steps of:

determining viewer eye position with respect to an axis of the optical system; and defining the distortion function for a particular color component of the color video display device based on the chromatically variant optical aberration of the optical system and the determined viewer eye position.

23. The method of claim 12, wherein a plurality of different images are sequentially displayed by the color display device at video rate and wherein an image pattern and a distorted image pattern are generated in real time for each of the plurality of images.

24. The method of claim 23 further comprising the steps of:

determining viewer eye position with respect to an axis of the optical system; and defining the distortion function for a particular color component of the color video display device based on the chromatically variant optical aberration of the optical system and the determined viewer eye position.

25. The method of claim 12, wherein a plurality of different images are sequentially displayed by the color display device at video rate and wherein an image pattern and a distorted image pattern are generated off line prior to display of any of the plurality of images.

* * * * *

UNITED STATES PATENT AND TRADEMARK OFFICE
CERTIFICATE OF CORRECTION

PATENT NO. : 5,369,450
DATED : November 29, 1994
INVENTOR(S) : Eric C. Haseltine and William G. Redmann It is certified that error appears in the above-indentified patent and that said Letters Patent is hereby corrected as shown below:

| Column | Line | |
|---|---|---|
| 8 | 37 | change "10" to --410-- |
| 8 | 39 | change "25" to --225-- |

Signed and Sealed this

Sixteenth Day of January, 1996

Attest:

BRUCE LEHMAN

Attesting Officer

Commissioner of Patents and Trademarks